J. W. GAMBLE.
WATER HEATER.
APPLICATION FILED SEPT. 20, 1918.
1,395,981.
Patented Nov. 1, 1921.
3 SHEETS—SHEET 3.
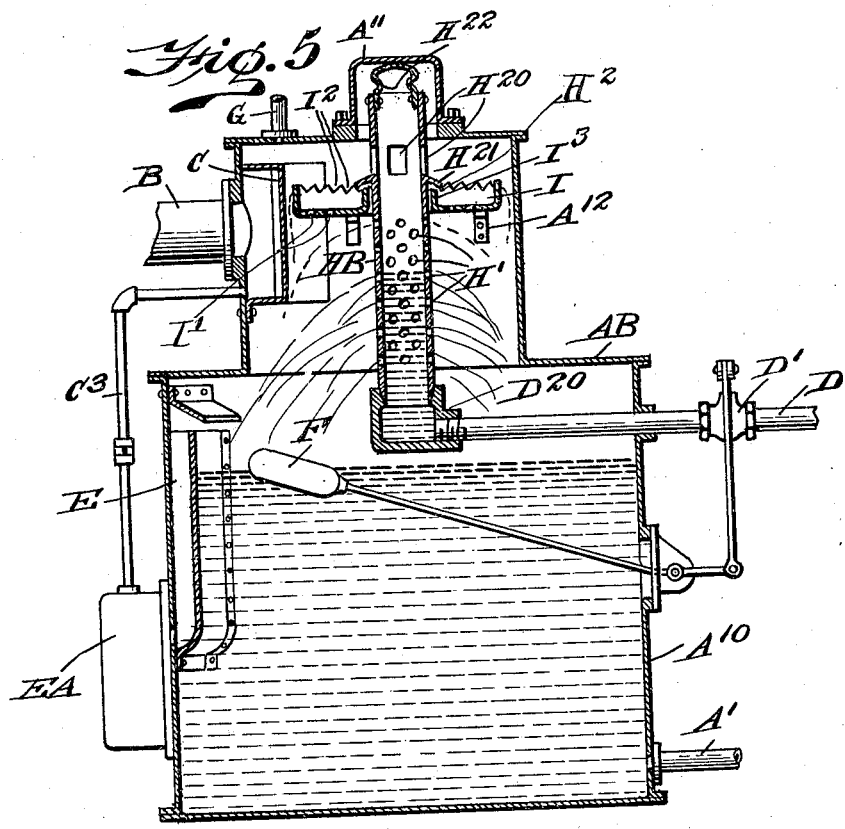
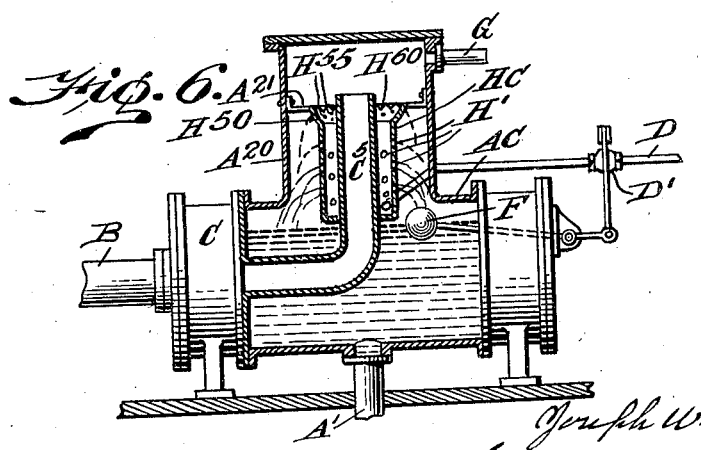

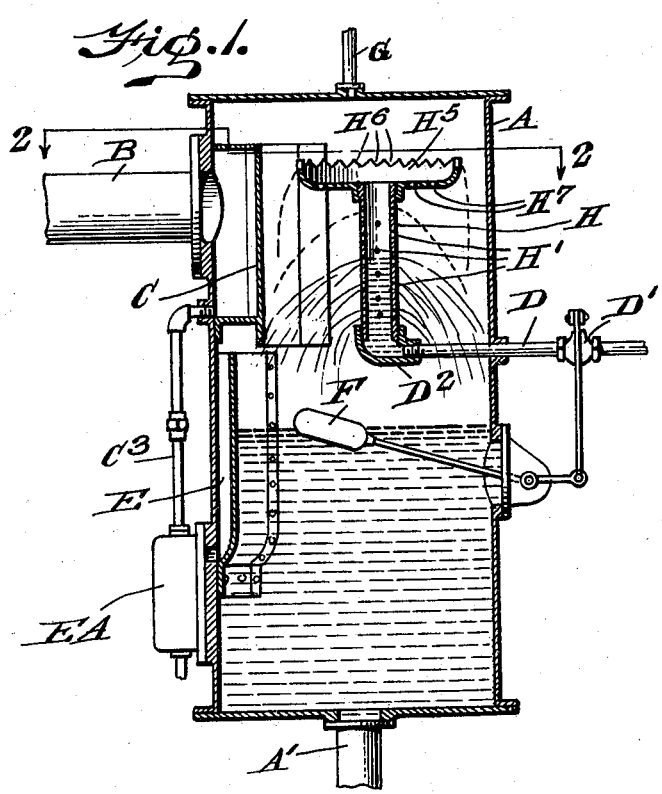
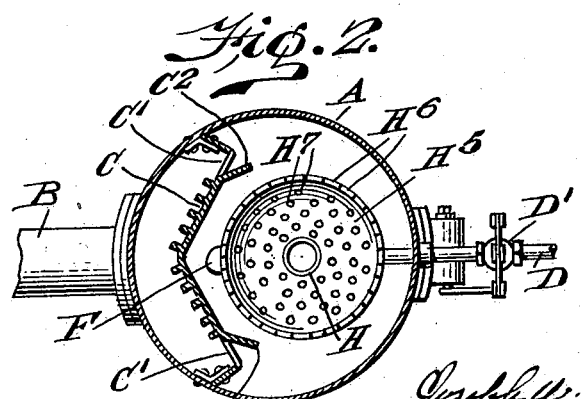

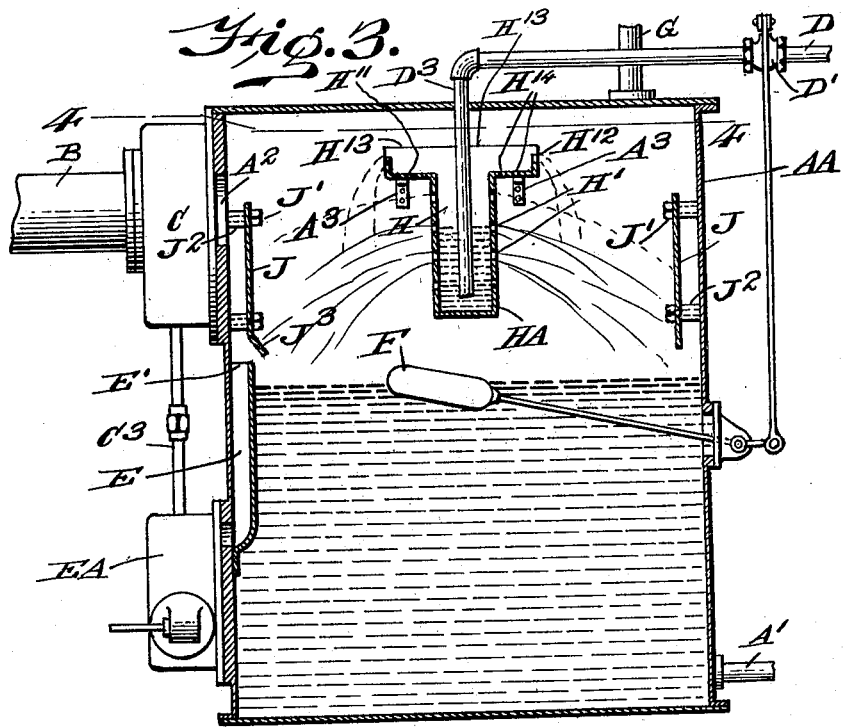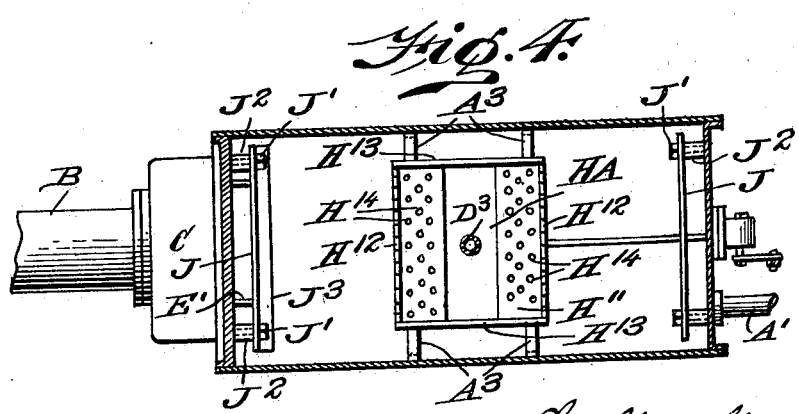

UNITED STATES PATENT OFFICE.

JOSEPH W. GAMBLE, OF PHILADELPHIA, PENNSYLVANIA, ASSIGNOR, BY MESNE ASSIGNMENTS, TO H. S. B. W.-COCHRANE CORPORATION, OF PHILADELPHIA, PENNSYLVANIA, A CORPORATION OF PENNSYLVANIA.

WATER-HEATER.

1,395,981.        Specification of Letters Patent.        Patented Nov. 1, 1921.

Application filed September 20, 1918. Serial No. 254,893.

*To all whom it may concern:*

Be it known that I, JOSEPH W. GAMBLE, a citizen of the United States of America, and resident of the city and county of Philadelphia, in the State of Pennsylvania, have invented certain new and useful Improvements in Water-Heaters, of which the following is a true and exact description, reference being had to the accompanying drawings, which form a part thereof.

My present invention relates to water heaters of the open feed water type in which the water to be heated is fed into the steam space of a heater chamber to which steam for heating the water is also admitted and in which the heating steam acts directly on the water and is wholly or partially condensed thereby. For practical efficiency in a heater of this type it is essential that the water to be heated shall pass through the steam space of the heater in sub-divided streams to provide a relatively large water surface exposed to the action of the steam. In the most successful and widely used heaters of this type heretofore constructed, the provision of a large water surface exposed to the steam, has been obtained by causing the water to flow in wide shallow broken streams over baffles or trays located at successively lower levels. These trays or baffles serve to prolong the period of time required for the passage of the water through the steam space of the heater, and to provide the large water surface exposed to steam contact, which is desirable for the progressive heating of the water. The tray or baffle type of open water heater while highly efficient and practical for many purposes is open to certain objections which it is the object of the present invention to avoid. In particular it is the object of the present invention to provide a simple and effective arrangement for feeding the water into the steam space of an open water heater which does not involve the usual trays or baffles heretofore employed, and presents the following advantages among others over the tray or baffle type of open water heaters; namely, a reduction in the weight, bulk, cost of construction of a heater for performing a given duty and having a given water storage space, and an elimination of, or at least a substantial reduction in the difficulties arising from the deposit of scale and other impurities on the water distributing means. My present invention presents the advantage also over the baffle or tray type of open heater, that it lends itself to a more effective combination of the heating and storage spaces of the heater to my varying space and operating conditions.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of my invention.

Of the drawings:

Figure 1 is a vertical section of a water heater constructed in accordance with the present invention.

Fig. 2 is a plan in section on the line 2—2 of Fig. 1.

Fig. 3 is a vertical section of a modified form of apparatus.

Fig. 4 is a plan in section on the line 4—4 of Fig. 3.

Fig. 5 is an elevation in section of a third form of the apparatus embodying my invention; and Fig. 6 is an elevation in section of still another embodiment of my invention.

In the drawings, and referring first to the construction shown in Figs. 1 and 2, A represents the heating chamber or tank. Steam, usually exhaust steam, is supplied to the upper end of the heating chamber A through a steam supply pipe B and separator C, which, as shown, is arranged within the heating chamber and comprises a vertically ribbed baffle plate in front of the steam pipe B with openings C' to the heating chamber proper at the sides of the separator. Oil and liquid of condensation collecting in the bottom of the separator C passes to the usual trap chamber EA through a pipe $C^3$. The trap EA receives in addition to the liquid entering through the pipe $C^3$, the overflow water out of the heater through the overflow passage E when the water level in the heater rises above the upper end of the overflow passage E. The water to be heated in the chamber A is supplied through a pipe D and is automatically controlled by a valve D' in the pipe D, which is operated by a float F. The latter opens and closes the valve D' accordingly as the water level in the chamber A falls below or rises to a predetermined level slightly below that at which the overflow through the passage E occurs. A' represents the outlet for heated water, and G represents a vent pipe for discharging air and steam or vapor not condensed within the tank A.

In so far as above described the open feed water heater shown in Figs. 1 and 2 does not differ in essence from heaters well known and widely used. In the heaters shown in Figs. 1 and 2, as well as in prior open feed water heaters, the bottom portion of the tank A serves as a hot water storage space, and the upper portion of the heater above the water level is a steam space through which the water to be heated is caused to flow, and in flowing through which it is acted upon by the steam with the result of heating the water and condensing all or a portion of the steam. The apparatus shown in Figs. 1 and 2 differs from the apparatus heretofore known to me, however, in the manner in which the water to be heated is dicharged into the upper steam or heating space proper of the tank A.

As shown in Figs. 1 and 2 the supply pipe D enters the chamber A slightly above the normal water level therein and is connected within the chamber A, through the elbow $D^2$, to the lower end of a vertical pipe H which is larger in diameter than the pipe D of which it forms a continuation. The pipe H is formed with a plurality of restricted discharge orifices H' distributed along its length, with the result that the water is discharged in normal operation through some or all of these orifices in the form of small jets. The height of water level in the pipe H, and in consequence the number of the jets in use at any time, will depend upon the rate at which water is then being supplied and upon the water discharge capacity of the individual orifices H'. The apparatus may well be so designed and proportioned that with the maximum normal rate of water supply through the pipe D, and with none of the orifices H' clogged either wholly or partially, the water level in the pipe H will be in the neighborhood of the uppermost orifice H', although where there is reason to expect appreciable clogging of the orifices H' to occur, the water level under the conditions specified above might well be lower than the uppermost orifice H'. Lips $C^2$ forming a part of the separator structure prevent water discharged through the orifices H' from passing into the separator through the ports C'.

The upper end of the discharge conduit H is open to provide an outlet for water when the amount of water supplied to the pipe H is in excess of the amount which the orifices H' will then discharge. The water flowing through the pipe H, and out of the open upper end of the latter, is initially received in a saucer like receptacle or pan $H^5$. The pan $H^5$, as shown, is formed with a centrally threaded opening in its bottom wall into which the upper end of the pipe H is screwed. The rim $H^6$ of the pan $H^5$ is serrated and small discharge orifices $H^7$ are formed in the bottom of the pan.

In operation the water to be heated is supplied to the tank A through the pipe D and its extension H at a rate depending upon the setting of the valve D', which is controlled in turn by the height of water level in the lower water storage portion of the tank. In normal operation the water level in the pipe H at any instant depends upon the rate at which water is supplied to the lower end of the pipe H and the discharge capacity of the distributed restricted orifices H' below the water level in the pipe H. An increase in the rate at which water is passed into the lower end of the pipe H will raise the height of water level in the pipe H, and a diminution in the discharge capacity of the orifices H', resulting from a partial closing of these orifices by deposited impurities in the pipe will also raise the height of water level in the pipe H. The increase in the height of water level in the pipe H by correspondingly raising the discharge head increases the effective discharge capacity of the lower orifices H', and in practice I prefer to design apparatus embodying my invention so that a considerable clogging of the discharge orifices H' may occur before these orifices will fail to discharge water at the normal maximum rate at which it is supplied through the pipe D. In consequence, no water will pass into the pan $H^5$ and be discharged through the bottom orifices $H^7$ and over the serrated edge $H^6$ with the normal maximum rate of water supply, until an excessive clogging of the normal discharge orifices H' has occurred. The water in the fine jets discharged through the orifices H' into the steam space of the tank is so effectively presented to and attacked by the steam that the volume of steam space required for a given water heating effect will, so long as the orifices H' are not substantially clogged up, be less than that required in the tray or baffle type of heater giving the same water heating effect.

The weight of the pipe H and overflow pan $H^5$ will be substantially less than the weight of the distributing trough and trays or baffles required in the tray or baffle type of heater of the same capacity. My apparatus is not appreciably affected moreover by material changes in inclination of the tank axis, so that the improved heater is well adapted for use on ship board, whereas the tray or baffle type of open heater is ordinarily not satisfactory for marine use.

When the clogging of the orifices H' causes a considerable proportion of the water to be heated to pass into the overflow pan H$^5$ and be discharged through the orifices H$^7$ and over the serrated edge H$^6$ of the latter, the efficiency of the heater is thereby reduced, and this reduction in efficiency becomes more marked when the orifices H$^7$ clog up and cause a still greater portion of the water to be discharged over the serrated edge H$^6$. I have reason to believe, however, that but little difficulty is to be anticipated from the clogging of the restricted discharge orifices H' and H$^7$ by impurities deposited from the water. In a practical use of my invention extending over a considerable period of time no appreciable clogging of the restricted discharge orifices has occurred, although the water heated is of a character which, with the baffle or tray type of heater, would have caused the baffles or trays to accumulate such amounts of deposited impurities as to require their cleaning in a much shorter period of time. I attribute this immunity of my improved apparatus from the clogging effect of deposited impurities to the fact that the clogging impurities are not precipitated from the water and deposited on surfaces contacted thereby until the water is highly heated.

The metallic pipe H will not, in normal operation, abstract heat rapidly enough from the steam space to heat the water passing through it to a temperature at which appreciable precipitation of impurities and their deposition upon the wall of the pipe H will occur. The relatively high velocity of discharge through the restricted orifices H' of the pipe H in itself tends to prevent clogging of the discharge orifices. The upper end of the discharge conduit H is open to provide an outlet for water supplied to the pipe H in excess of the amount which the orifices H' will discharge.

The use of the present invention lends itself to the use of heating tanks circular in horizontal cross section which are preferable to tanks rectagular in cross section in many cases being usually less expensive to manufacture. In some cases, however, it may be desirable to use the present invention with tanks rectangular in cross section, and in Figs. 3 and 4 I have shown an example of such use. The rectangular tank AA, shown in Fig. 3, has associated with it parts B, C, C$^3$, D, D', E, EA, F and G corresponding in substance with the correspondingly designated parts of the construction first described. In Figs. 3 and 4 the separator C is external of the tank AA, steam passing from the separator into the tank through orifice A$^2$. The water supply pipe D, shown in Figs. 3 and 4, comprises a downturned vertical portion D$^3$ which enters the tank through its top wall and extends downward into a box like part HA, open at its upper end, which forms the apertured spray discharging vertical conduit analogous in function to that of the pipe section H of the construction first described. The receptacle HA is enlarged at its upper end to form a pan H$^{11}$ corresponding in function to the pan H$^5$ of Figs. 1 and 2. The pan H$^{11}$ has its two opposite edges H$^{12}$ serrated to divide the overflow into separate streams. The serrated edges H$^{12}$ face the end walls of the tank AA which is horizontally elongated in one direction as compared with the transverse direction. The two side walls of the body portion of the receptacle HA, which are parallel to the serrated edges H$^{12}$, are formed with distributed restricted discharge orifices H'. The end walls of the receptacle HA, adjacent the side walls of the tank, are not perforated, and they extend upward as indicated at H$^{13}$ above the serrated discharge edges H$^{11}$. Orifices H$^{14}$ are formed in the bottom of the overflow pan H$^{11}$. The purpose of restricting the overflow from the receptacle to the two serrated edges H$^{12}$ is to prevent the jets of water discharged from coming into direct contact with the tank wall. For the same reason I advantageously mount baffle or guard walls J in position to prevent the jets issuing through the discharge orifices H' from directly impinging against the tank walls. As shown, the baffles J are spaced away from the tank walls AA and secured in place by means of bolts J' and spacer blocks J$^2$. The lower end of the left hand baffle J, as shown in Fig. 3, is bent inward as indicated at J$^3$ to form a guard preventing water jets from carrying into the open upper end of the overflow passage E. The receptacle HA is supported from the tank wall through brackets A$^3$.

The apparatus shown in Figs. 5 and 6 differs essentially from that shown in Figs. 1 and 2 only in the construction of the apertured discharge portion of the water supply conduit and in the shape of the tank AB, which has its lower portion containing the water storage space larger in diameter than the upper portion in which the bulk of the heating chamber is formed. In Fig. 5 the apertured water discharge pipe HB has its lower end tapered to fit in a conical socket formed in an elbow D$^{20}$ secured to the inner end of the pipe D proper. A spring bail H$^{22}$ secured to the upper end of the pipe section HB forms a handle through which the pipe HB can be lifted out of the tank for cleaning or renewal when the removable cover portion A$^{11}$ of the tank is detached, and as a spring engaged by the cover section A$^{11}$ to hold the pipe HB simply in place in the elbow D$^{20}$ when the apparatus is assembled as shown in Fig. 5. Overflow outlets $H^{20}$ are formed in the pipe section HB above the orifices H′ below the extreme upper end of the pipe. The orifices $H^{20}$ discharge into an annular overflow pan I formed with orifices I′ and a serrated outer edge $I^2$. The water issuing through the outlets $H^2$ is carried over the upstanding tubular portion $I^3$ of the pan I which surrounds the pipe section HB by the tongue portions $H^{21}$ of the pipe HB. The pan I is carried by brackets $A^{12}$ from the tank wall. With the arrangement shown in Fig. 5 the pipe section HB can be quickly and easily removed and replaced when the necessity for cleaning it arises.

In the apparatus shown in Fig. 6 the apertured portion of the water supply pipe HC is centrally disposed in the uprising portion $A^{20}$ of the storage tank AC, which in this shape is in the form of an elbow with the steam separator C secured to one end of the elbow. From the steam separator a curved steam pipe $C^5$ leads upward centrally through the section HC. The latter is enlarged at its upper end to form an overflow pan $H^{50}$ with a serrated outer edge $H^{60}$ and bottom discharge orifices $H^{55}$.

While in accordance with the provisions of the statutes I have illustrated and described the best form of my invention now known to me, it will be apparent to those skilled in the art that changes may be made in the form of my invention without departing from its spirit, and that some features of my invention may sometimes be used to advantage without a corresponding use of other features.

Having now described my invention, what I claim as new and desire to secure by Letters Patent, is:

1. In an open water heater, the combination with a heating chamber having a steam inlet opening into its upper portion and the water outlet opening from its lower portion, of water supply means comprising a conduit having a vertical portion which is located in said chamber and receives the water to be heated at its lower end, said vertical conduit portion having restricted outlet orifices formed in it at different levels, and of an aggregate discharge capacity greater than the water supplied to the conduit.

2. In an open water heater, the combination with a heating chamber having a steam inlet opening into its upper portion and the water outlet opening from its lower portion, of water supply means comprising a conduit having a vertical portion which is located in said chamber and receives the water to be heated at its lower end, said vertical conduit portion having restricted outlet orifices formed in it at different levels and of an aggregate discharge capacity greater than the water supplied to the conduit and having a free discharge opening above the level of said outlet orifices.

3. In an open water heater, the combination with a heating chamber having a steam inlet opening into its upper portion and a water outlet opening from its lower portion, of water supply means comprising a conduit having a vertical portion which is located in said chamber and receives the water to be heated at its lower end, said vertical conduit portion having restricted outlet orifices formed in it at different levels and of an aggregate discharge capacity greater than the water supplied to the conduit and having a free discharge opening above the level of said outlet orifices and a receptacle arranged to receive the water from the free discharge opening and discharge such water in distributed streams into the heating chamber.

JOSEPH W. GAMBLE.